(12) United States Patent
Riveira Rodriguez et al.

(10) Patent No.: US 8,229,717 B2
(45) Date of Patent: Jul. 24, 2012

(54) METHOD FOR SIMULATING THE BEHAVIOR OF A BONDED JOINT OF TWO PARTS

(75) Inventors: Ignacio Riveira Rodriguez, Madrid (ES); Juan Luis de La Gándara Verano, Madrid (ES)

(73) Assignee: Airbus Espana, S.L., Madrid (ES)

( * ) Notice: Subject to any disclaimer, the term of this patent is extended or adjusted under 35 U.S.C. 154(b) by 547 days.

(21) Appl. No.: 12/080,087

(22) Filed: Mar. 31, 2008

(65) Prior Publication Data

US 2009/0192766 A1    Jul. 30, 2009

(30) Foreign Application Priority Data

Jan. 30, 2008    (ES) .................................. 200800236

(51) Int. Cl.
*G06G 7/48*    (2006.01)

(52) U.S. Cl. ........................................................... 703/6

(58) Field of Classification Search .................. 703/2, 6
See application file for complete search history.

(56) References Cited

U.S. PATENT DOCUMENTS

2008/0015827 A1 *   1/2008   Tryon et al. ...................... 703/2

* cited by examiner

*Primary Examiner* — David Silver

(74) *Attorney, Agent, or Firm* — Ladas & Parry LLP (57) ABSTRACT

A method for simulating the behavior of a bonded joint of two composite material parts with an adhesive material layer. The method includes the steps of a) providing a Finite Element Model with all the relevant information for analyzing the structural joint; b) providing a calculation model for calculating the deformations of the adhesive material layer when it is subjected to tensile/peel and shear stresses, including a plastic behavior of the adhesive of a linear type under tension/peeling and of a non-linear type under shearing; and c) simulating the behavior of the bonded joint by applying the calculation model to obtain the failure indices of each failure mode. A system which is useful as an aid in the design of the structural joint using a computer-implemented Finite Element Model of the structural joint.

6 Claims, 12 Drawing Sheets

METHOD FOR SIMULATING THE BEHAVIOR OF A BONDED JOINT OF TWO PARTS

FIELD OF THE INVENTION

The present invention relates to a method for simulating the behavior of a joint of two parts bonded by means of an adhesive layer and more particularly, to the joint of two composite material parts, such as a planar panel and a stiffening element, used in aeronautical structures.

BACKGROUND OF THE INVENTION

The use of composite materials in the design of aeronautical structures began timidly after World War II. The first materials, basically glass fibers embedded in polyester resins were used in the design of secondary structure elements, such as radomes, protection of antennas and hulls. The constant evolution of the developments of new materials has led to the progressive use thereof in more airplane components.

Twenty-five years of accelerated evolution, both of the properties of the materials and the knowledge of their behavior, have passed since the milestone of the certification of the first primary structure element of a passenger airplane completely designed with composite material was achieved in the 1980s until today, when the launch of the design of the greater part of the structure of an airplane in composite material is studied.

The composite materials that are most used in the aeronautical industry consist of fibers or fiber bundles embedded in a matrix of thermosetting or thermoplastic resin, in the form a preimpregnated material or "prepreg".

Without the intention of being exhaustive, the advantages of composite materials can be specified in three essential aspects:

Their high specific strength with respect to metal materials. It is the strength/weight equation.
Their excellent behavior under fatigue loads.
The possibilities of structural optimization concealed behind the anisotropy of the material and the possibility of combining fibers with different orientations, allowing the design of elements with different mechanical properties adjusted to the different needs in terms of applied loads.

Although it is possible to manufacture an aeronautic structure with a complex shape such as a stiffened panel in a single part, it is usually more efficient to separately manufacture the panel and the stiffeners and subsequently join them by means of an adhesive element, in which case the structural behavior of the joined part logically depends both on the behavior of each of the assembly parts and on the behavior of the adhesive element used which must be designed with very demanding failure criteria.

Two methods have basically been used in the prior art to analyze the behavior of the bonded joints of composite material parts: test methods and analytical methods.

The advantage of test methods is that they allow analyzing complicated (real) geometries and taking into account non-linear effect and load eccentricities without any major complication and their drawback is that they do not allow a parametric analysis, which is essential in design activities, and that they are complex and very expensive.

The advantage of analytical methods is that, once implemented, they involve a reduced computational cost and that they allow a quick parametric analysis (which is essential in design) and their drawback is that they do not (simply) contemplate two-dimensional problems and/or non-linear problems such as those related to large displacements and rotations, plastic behavior of the adhesive material, direction of the applied loads dependent on the deformation of the structure.

The present invention is aimed at solving the deficiencies of said methods.

SUMMARY OF THE INVENTION

An object of the present invention is to provide methods and systems for simulating a bonded joint between two composite material parts which facilitates determining its failure criteria.

Another object of the present invention is to provide methods and systems for simulating a bonded joint between two composite material parts which allows determining its failure criteria taking into account the non-linearities typical of the behavior of these types of structures.

Another object of the present invention is to provide methods and systems for simulating a bonded joint between two composite material parts which facilitates determining its failure criteria for different values of the geometric parameters of the joint elements, thus facilitating a parametric analysis of the joint, especially in the case of joints occurring in stiffened panels typical of aeronautical structures.

In a first aspect, these and other objects are achieved by means of a computer-aided method aiding in the design of a structural joint of two composite material parts with an adhesive material layer, comprising the following steps:

Providing a Finite Element Model with all the relevant information for analyzing said structural joint.
Providing a calculation model for calculating the deformations of the adhesive material layer when it is subjected to tensile/peel and shear stresses, including a plastic behavior of the adhesive of a linear type under tension/peeling and of a non-linear type under shearing.
Simulating the behavior of said bonded joint by applying said calculation model to obtain the failure indices of each failure mode.

In a second aspect, these and other objects are achieved by means of a system useful as an aid in the design of a structural joint of two composite material parts with an adhesive material layer, comprising:

A computer-implemented Finite Element Model of said structural joint with a calculation model for calculating the deformations of the adhesive material layer when it is subjected to tensile/peel and shear stresses, including a plastic behavior of the adhesive of a linear type under tension/peeling and of a non-linear type under shearing, which allows simulating the behavior of said bonded joint to obtain the failure indices of each failure mode.
A computer-implemented modulus containing the parametric definition of the relevant features of said joint and which allows providing the input data of said Finite Element Model.

Other features and advantages of the present invention will be inferred from the following detailed description of an illustrative embodiment of its object in relation to the attached figures.

DETAILED DESCRIPTION OF THE INVENTION

Figure 1:
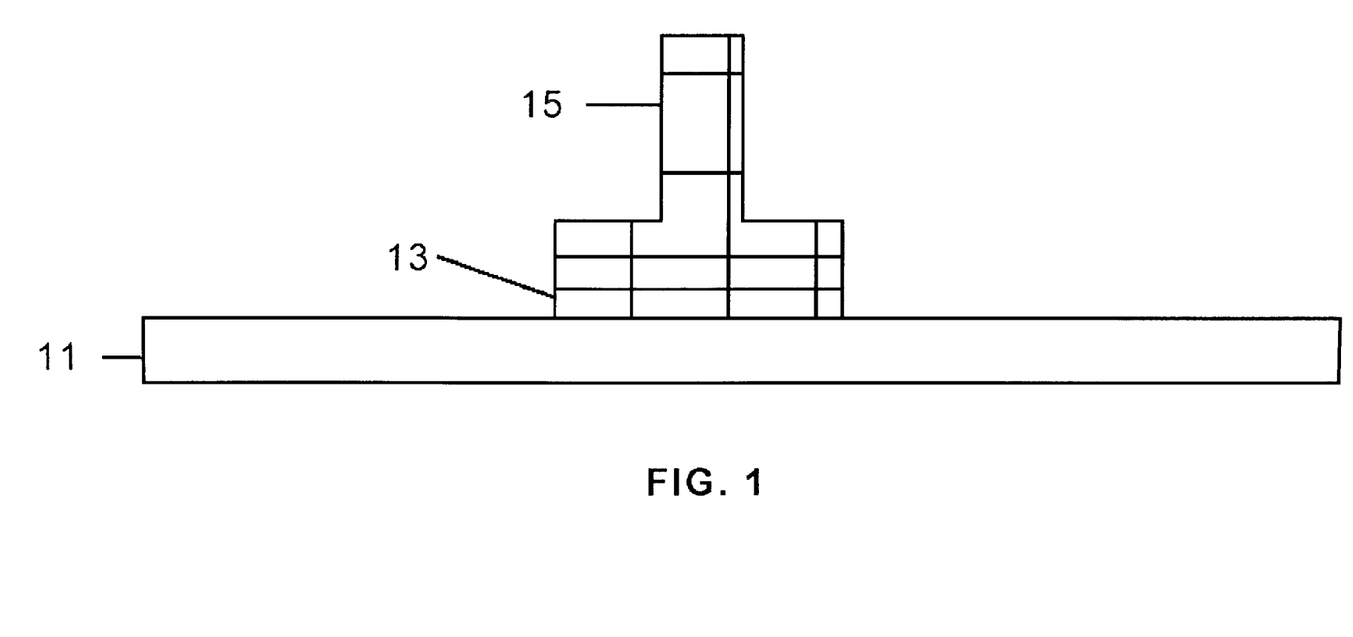
FIG. 1 is a schematic view of a bonded joint between two composite material parts: a planar panel and a stiffening element.

Bonded joints such as that shown in FIG. 1, in which the stiffening elements 15 is joined to the panel 11 by means of an adhesive layer 13, are frequently used in the stiffened panels used in aeronautical structures.

The problem of these types of bonded joints is a problem with the following basic characteristics:

It is a two-dimensional problem which can have a complex geometry.

The stress condition in the three-dimensional adhesive body comprises tensile (or peel) stresses and shear stresses.

Large displacements due to buckling phenomena or large rotations of the adhesive layer due to load eccentricities can occur.

The adhesive has a plastic behavior under shearing.

Figure 2:
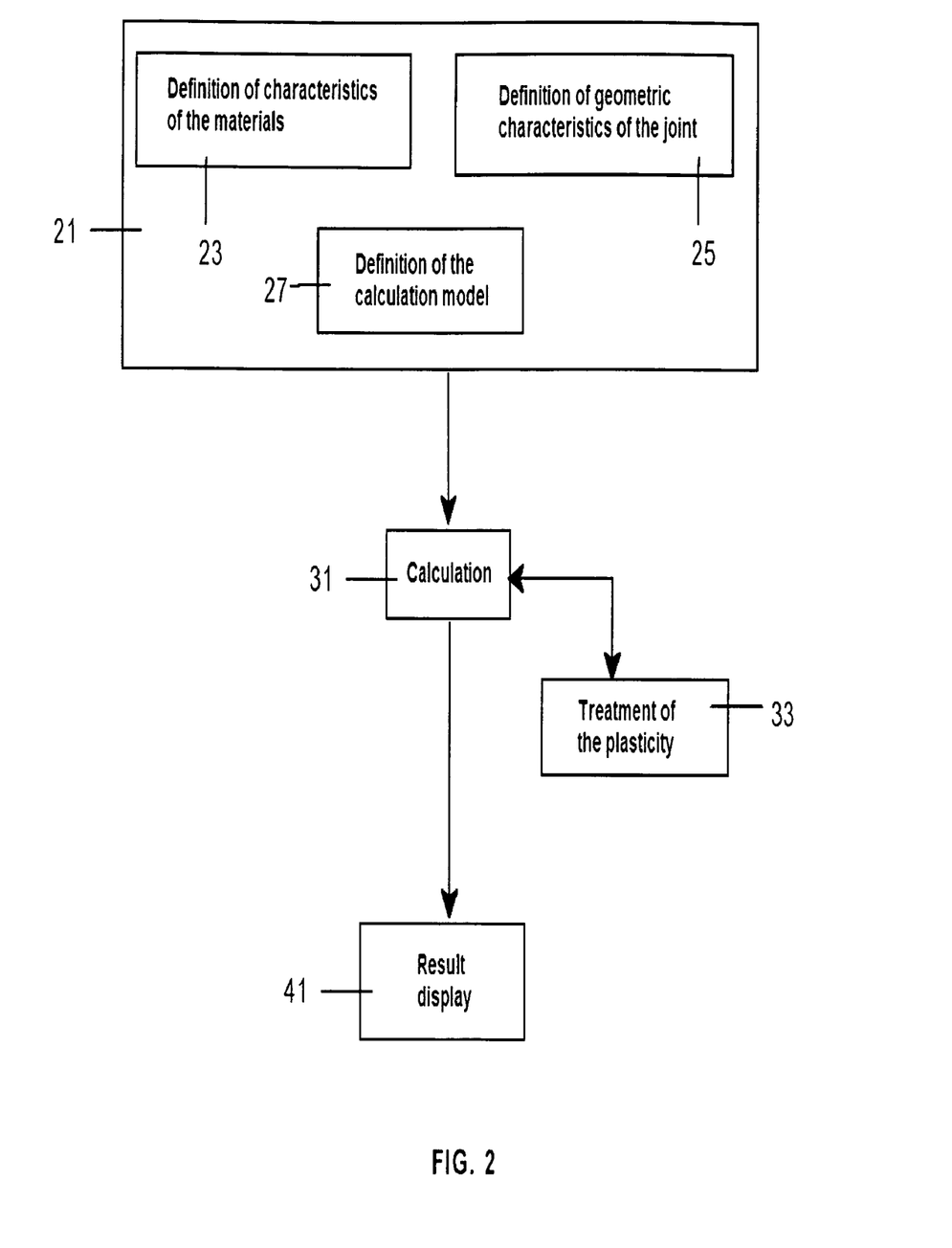
FIG. 2 is a block diagram of the method object of the present invention.

An embodiment of the method of the present invention is described in detail below, comprising the following three main steps:

Preparation step 21, including a sub-step 23 of defining the characteristics of the materials of the bonded joint, a sub-step 25 of defining the geometric characteristics of the joint and a sub-step 27 of creating a calculation model for calculating the stresses-deformations in the adhesive layer.

Calculation step 31, including a sub-step 33 for carrying out an iterative process for the treatment of plasticity.

Result display step 41.

The following hypotheses are assumed in sub-step 23 of defining the characteristics of the materials of the joint:

The panel 11 and the stringers 15 (i.e. the adherent elements) are made of stacks of (orthotropic) composite material laminas behaving in a linear elastic manner.

The material of the adhesive layer 13 is isotropic and is characterized by having a decoupled plastic behavior under tension and under shearing. Under tension, it behaves in a linear elastic manner with brittle fracture and under shearing, it behaves in a non-linear manner with large plastic fracture deformations ($\gamma$~0.3-0.4 depending on the type of adhesive).

Given the working temperatures, the dependence of the behavior of the adhesive material with the rate of deformation is discarded.

The plastic behavior is modeled depending on the type of adhesive material used, on the thickness of the adhesive layer, on the geometry of the joint and on the way this joint works.

As explained below, there are different plastification criteria behaving better or worse depending on the characteristics listed in the previous paragraph.

Figure 3:
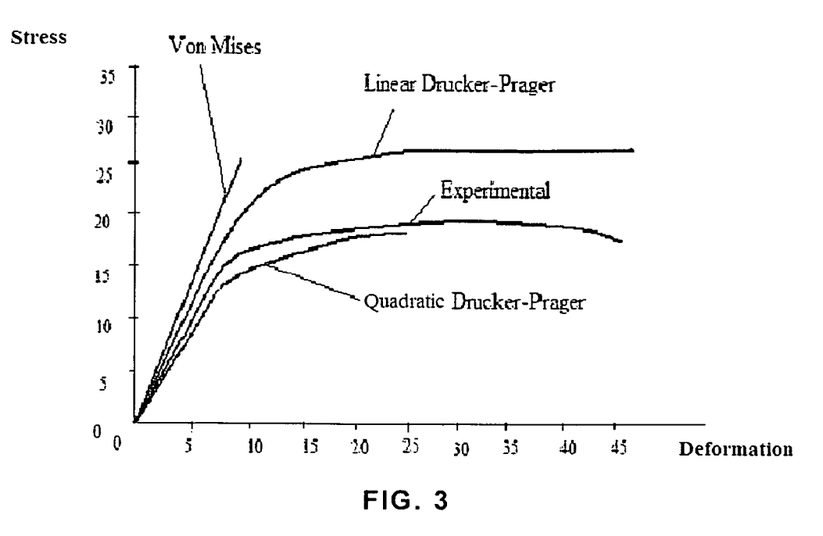
FIG. 3 shows analytical models on the plastic behavior of the adhesive material.

As can be deduced from FIG. 3, in which the stress is graphically shown against the deformation of a butt-joint type specimen according to different analytical criteria on one hand and according to real experimental results on the other hand, the best analytical criterion is the quadratic Drucker-Prager criterion. The linear criterion yields plastification stresses that are greater than the real stresses when the hydrostatic stress has high values, whether it is positive or negative. This makes its use not recommendable for bonded joints between the stiffener and the panel, as the existence of localized areas with high hydrostatic stress values is very common.

Plastification criteria taking into account the hydrostatic stress actually simulate in an approximate manner the effect that tensile stresses have in the plastification process based on the generation and coalescence of microcavities. This is a phenomenon to be taken into account when large volumetric deformations occur in an adhesive layer, they are joints intended to work basically under tension.

Figure 4:
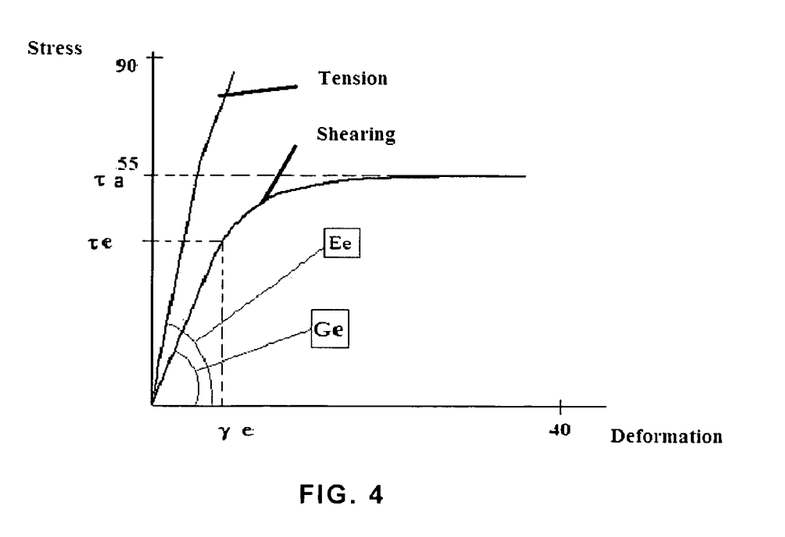
FIG. 4 shows the decoupled plastic behavior of the adhesive material under tension and under shearing.

As already mentioned, the plastic behavior of the adhesive is very different depending on whether the adhesive is subjected to shearing or to tension or peeling. This can be seen in FIG. 4, showing real experimental results. The behavior under peeling is virtually linear and fails when the stress level reaches a certain critical value, it is a brittle behavior, whereas the behavior under shearing is highly non-linear and fails at high values of deformation under shearing, under almost constant stress.

This decoupled behavior makes the use of models with 3D elements (HEXA type in NASTRAN), which was usually carried out up until now, have problems because they use a stress combination, the Von Mises combination for example, which has to follow a stress/deformation curve when actually there is hardly any coupling of the plastic behavior under tension and under shearing. In order to take this into account by means of a conventional finite element model, it is necessary to duplicate nodes and elements to physically separate the two behaviors.

In the method object of the present invention, however, a model with springs is used, in which for each point of the adhesive layer there is a spring simulating the behavior under peeling and another two springs simulating the behavior under shearing. If it is carried out in an iterative manner, the points of the adhesive can be made to follow the non-linear stress/deformation curve under shearing (the experimental one of the material) and maintain the elastic behavior under tension/peeling, whereby the mentioned decoupled behavior under tension/peeling and under shearing is assumed.

In sub-step 25, all the characteristics of the structure are defined in a "modelo.dat" file like the one shown below, indicating the meaning of each variable and which is suitably structured for enabling the corresponding parametric studies by carrying out the corresponding variations in the data.

S (step between the stringers/mm) 270.
AR (residual width of the panel/mm) 100.
tp (thickness of the panel/mm) 5.
n (no. of stringers/mm) 2.
al (width of the stringer foot/mm) 70.
tpl (thickness of the stringer foot/mm) 3.
Hl (height of the stringer/mm) 80.
tad (thickness of the adhesive/mm) 0.15.

NeyAR (no. of elements according to y in the residual width) 2.
Neyil (no. of elements according to y in the piece of panel between stringers) 3.
Nez (no. of elements according to z in the stringer web) 5.
H (position of the web with respect to the side of the stringer in the stringer foot/mm) 30.
Neypl1 (no. of elements according to y in the right segment in the stringer foot) 5.
Neypl2 (no. of elements according to y in the left segment in the stringer foot) 7.
Neycl1 (no. of elements according to y and in the right segment in the stringer head) 5.
Neycl2 (no. of elements according to y and in the left segment in the stringer head) 4
ac (width or dimension y of the stringer head/mm) 50.
Hs (position of the web with respect to the side of the stringer in the stringer head/mm) 30.
DBC,STEP1,STEP2,STEP3,STEP4,STEP5,STEP6,STEP7, STEP8,STEP9,DBC1,n cost (length of the intervals between ribs/mm) 200. 600. 200. 0. 0. 0. 0. 0. 0. 0. 2
NexDBC,NexS1,NexS2,NexS3,NexS4,NexS5,NexS6, NexS7,NexS8,NexS9,Nex DBC1 40 10 20 0 0 0 0 0 0 0 0
p (axial load per unit length N/mm) 100.
q (shear load per unit length N/mm) 130.
PANEL LAMINATE($1^{ST}$ LINE: number of layers; $2^{ND}$ LINE: theta1, theta2, ... thetai, ... theta20; $3^{RD}$ LINE:t1, t2, ... ti, ... t20) 20
45. −45. 90. 0. 90. −45. 45. 0. 0. 0. 0. 0. 0. 45. −45. 90. 0. 90. −45. 45.
0.25 0.25 0.25 0.25 0.25 0.25 0.25 0.25 0.25 0.25 0.25 0.25 0.25 0.25 0.25 0.25 0.25 0.25 0.25 0.25
STRINGER FOOT LAMINATE ($1^{ST}$ LINE: number of layers; $2^{ND}$ LINE: theta1, theta2, ... thetai, ... theta20; $3^{RD}$ LINE:t1, t2, ... ti, ... t20) 12
+45 −45. 90. 0. 90. 0. 0. 90. 0. 90. −45. 45. 0. 0. 0. 0. 0. 0. 0.
0.25 0.25 0.25 0.25 0.25 0.25 0.25 0.25 0.25 0.25 0.25 0.25 0. 0. 0. 0. 0. 0. 0.
STRINGER WEB LAMINATE ($1^{ST}$ LINE: number of layers; $2^{ND}$ LINE: theta1, theta2, ... thetai, ... theta20; $3^{RD}$ LINE:t1, t2, ... ti, ... t20) 12
+45 −45. 90. 0. 90. 0. 0. 90. 0. 90. −45. +45 0. 0. 0. 0. 0. 0. 0.
0.5 0.5 0.5 0.5 0.5 0.5 0.5 0.5 0.5 0.5 0.5 0.5 0. 0. 0. 0. 0. 0. 0.
STRINGER HEAD LAMINATE ($1^{ST}$ LINE: number of layers; $2^{ND}$ LINE: theta1, theta2, ... thetai, ... theta20; $3^{RD}$ LINE:t1, t2, ... ti, ... t20) 12
+45 −45. 90. 0. 90. 0. 0. 90. 0. 90. −45. 45. 0. 0. 0. 0. 0. 0. 0.
0.25 0.25 0.25 0.25 0.25 0.25 0.25 0.25 0.25 0.25 0.25 0.25 0. 0. 0. 0. 0. 0. 0.

After the above, in sub-step 27, a calculation model is defined.

Finite element models divide the structure object of study into small "elements" in which a series of degrees of freedom which are the displacements and the rotations in the nodes (six degrees of freedom) are defined, which will be the unknowns of the problem.

Functions are defined such that the displacements inside the element itself are related to the displacements in the nodes. Once this has been carried out, the deformations are obtained using kinematic equations and subsequently the stresses are obtained from the deformations by means of applying constitutive equations.

The principle of virtual work (or another energetic principle) is then applied to each type of element and the rigidity matrices of each of them are obtained. The rigidity matrix relates the forces in the nodes with the displacements. Once the rigidity matrix of each element has been calculated in local axes, it must be changed to global axes by means of the reference system change matrices.

After this has been carried out, the rigidity matrices of all the elements are assembled in order to obtain a global rigidity matrix of the structure.

It is important to take into account that upon applying the principle of virtual work to the element, the balance thereof at a global level is complied with, but the stresses that are subsequently obtained upon applying constitutive equations does not have to satisfy internal balance equations, and there does not have to be stress continuity upon passing from one element to another either.

The global rigidity matrix of the structure is singular because the necessary supports to prevent the latter from moving freely as a rigid solid or from behaving like a mechanism have not been applied. The degrees of freedom that a displacement has assigned thereto (single point constraint, SPC), as well as those which are a linear combination of the displacements in a series of nodes (multiple point constraint, MPC) must therefore be eliminated.

The loads are then applied in the nodes. At this point, the matrix obtained is normally regular and therefore the system of equations is ready to be solved.

The FEM model is implemented using the commercial NASTRAN computer program and a computer program of the method object of the present invention to process the aforementioned "modelo.dat" file providing the input data.

Figure 5:
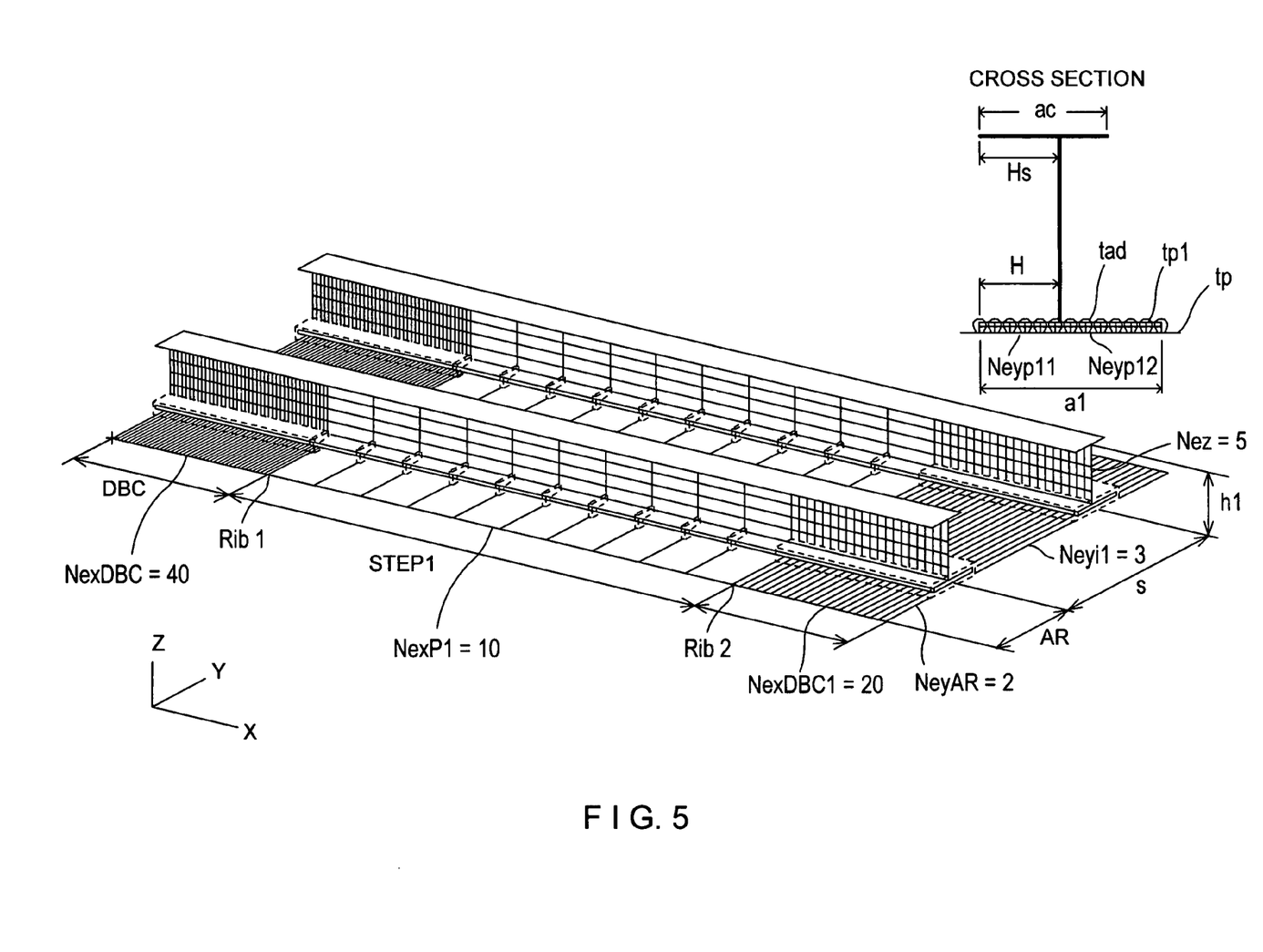
FIG. 5 shows the FEM model used in an embodiment of the method object of the present invention.

The resulting FEM model is shown in FIG. 5, in which the parameters defining the geometry and wireframe of the model can be seen.

Figure 6:
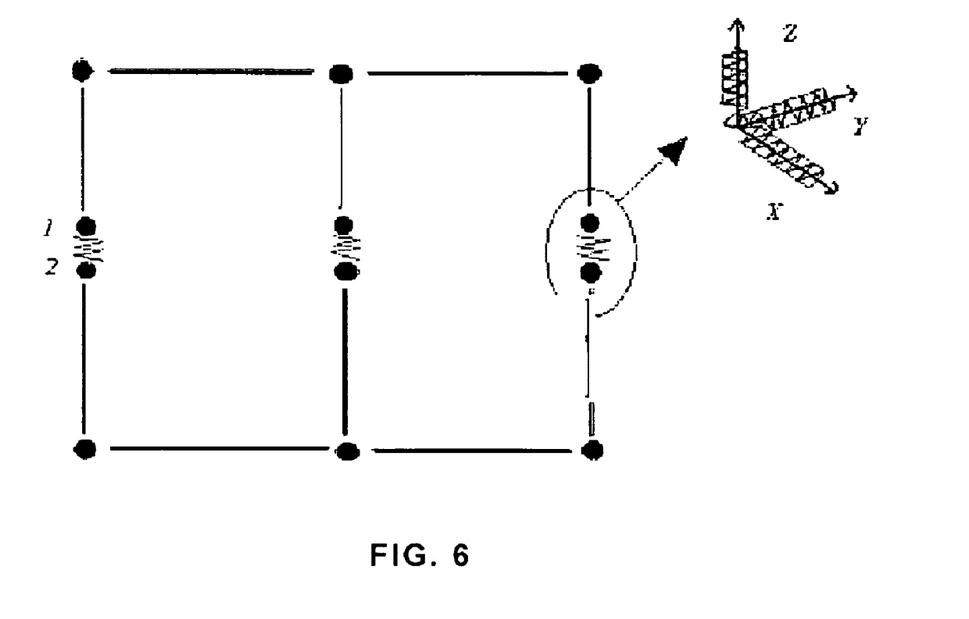
FIG. 6 shows the elements used to simulate the basic components of the joint with the NASTRAN software.

The computer program of the method object of the present invention also generates NASTRAN input data to simulate the panel and the stringers with two-dimensional elements and the adhesive with spring elements. FIG. 6 shows the structure of the idealization of the adhesive layer with the springs.

The cards of the nodes, GRID cards, the cards of the CQUAD4, CELAS2, RBAR elements, the cards of the PCOMP properties for the laminates are therefore generated in this step. Then, the cards of the materials, the MAT8 for orthotropic two-dimensional material for each of the laminas. Cards for defining contour conditions, SPC Single Point Constraint cards and the cards defining the applied loads, FORCE cards, are also created. Cards for scalar points, SPOINT cards, and MPC cards for defining the degrees of freedom of the "spoints", as relative displacements of the nodes between which the springs are located, divided between the thickness of the adhesive, are also included. In other words, the values of the degrees of freedom of the "spoints" are the deformation at each point of the adhesive layer.

Between the coincident nodes, one node of one surface and the other node of the other surface, there are placed springs (CELAS2 in linear and CBUSH1D for non-linear) joining them (relating the degrees of freedom of both of them). The springs are dimensionless elements and there will be three springs for each pair of nodes, one for each displacement direction. The spring in direction z represents the tensile/peel rigidity of the adhesive and the springs in direction x and y represent the shear rigidity.

Figure 7:
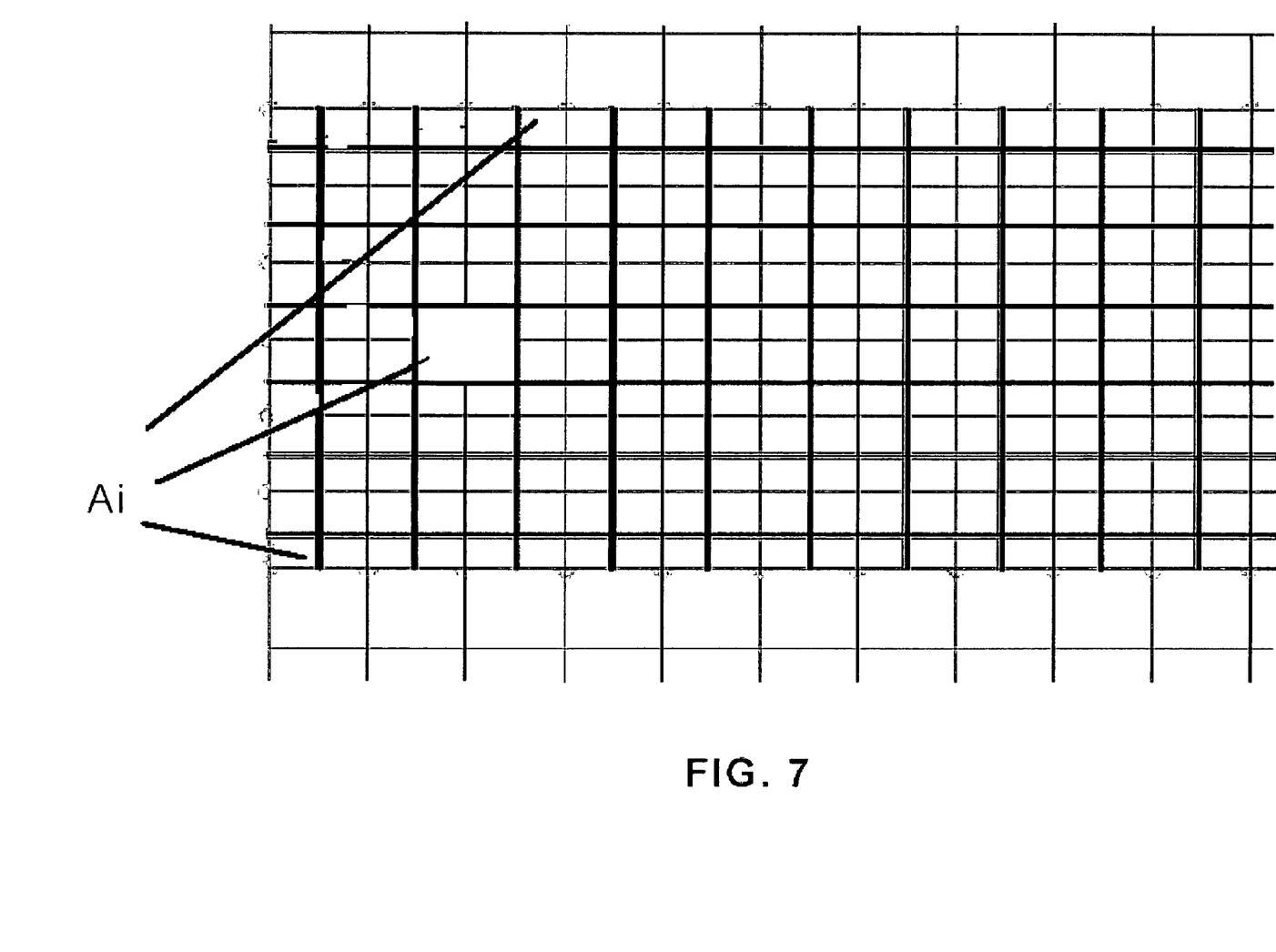
FIG. 7 shows the areas assigned to the springs joining each pair of coincident nodes on the mid-surface of the adhesive layer.

To complete the definition of the model, an action area $A_i$ and a rigidity value must be assigned to each spring. The area $A_i$ assigned to each spring depends on the position, within the adhesive layer, of the nodes which are being joined and this is clearly seen if the model is seen from the z axis. FIG. 7 shows the adhesive layer and the areas Ai assigned to the springs from the z axis.

The areas are used to recover the stresses once the forces are in the springs. The deformations can be obtained from the displacements in coincident nodes. To obtain the forces, stresses and deformations, it is assumed that displacements U1 and U2 of coincident nodes 1 and 2, respectively, are available (see FIG. 6). Then, for position i:

$$F_z i = k_z i \times (U1_z - U2_z); \sigma_{zz} i = F_z i / Ai$$

$$F_x i = k_x i \times (U1_x - U2_x); \sigma z_x i = F_x i / Ai$$

$$F_y i = k_y i \times (U1_y - U2_y); \sigma z_y i = F_y i / Ai$$

$\epsilon_{zz} i = (U1_z - U2_z)/\eta$ wherein $\eta$ is the thickness of the adhesive.

$$\gamma_{zx} i = (U1_x - U2_x)/\eta; \gamma_{zy} i = (U1_y - U2_y)/\eta$$

Rigidity values representing the real tensile/peel and shear rigidities of the adhesive layer have been introduced in the previous formulas.

The starting point will be obtaining the rigidity values of the springs according to direction z representing the tensile/peel rigidity. What occurs in reality must be simulated, but for the sake of simplification, the spring will be compared with an adhesive material beam with a length of the thickness of the layer and a cross-sectional area of the area assigned to the node (see FIG. 8).

Figure 8:
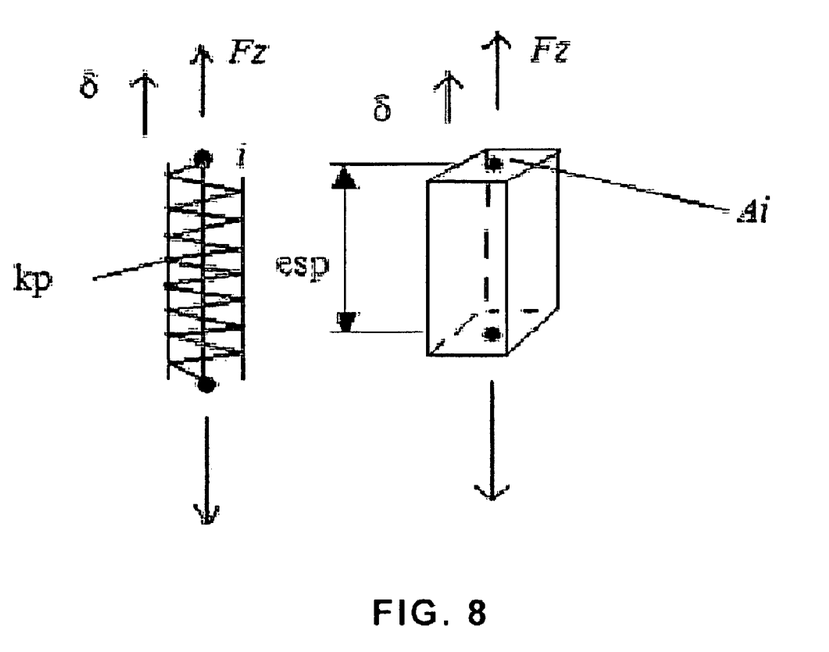
FIGS. 8 and 9 schematically show the way to calculate the tensile/peel and shear rigidities.

Upon applying a force Fz to the spring and to the beam, they will have one and the same displacement d as they are equivalent. Therefore:

$$E\text{eff.internal} = E\text{adhesive} = E$$

$$Kp*\text{delta} = ai*E*\text{delta}/th$$

and subsequently:

$$KP = Ai*E\text{eff.internal}/th; E\text{adhesive} = E$$

In FIG. 8, the node i has been considered having an inner position within the adhesive layer, but it could also have been in an edge or in a corner. In these cases, the formula is the same but the effective tensile/peel rigidity moduli must be used:

$$E\text{eff.def.plan} = E*((1-v)/(1-v-2v^2))$$

$$\text{Eff.stress.plan} = E(1-v^2)$$

These effective tensile/peel rigidity modulus values for the springs of the edges and of the corners of the adhesive layer have been obtained from the document "Finite Element Modeling of an Adhesive in a Bonded Joint; FEMCI The Book; NASA Goddard Space Flight Center; Farhad Tahmasebi, Ph.D.; July, 1999".

Figure 9:
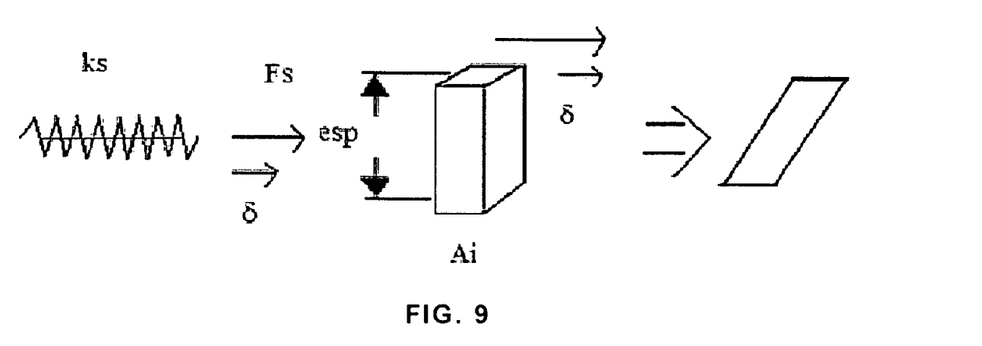

A similar way is used for the springs representing the shear rigidity (see FIG. 9), obtaining for the spring in direction x or in direction y:

$$Ks = G*Ai/th$$

As a summary, the following should be stated:
The expressions of the rigidities of the springs are the following:

$$k_{Pt} = \frac{E' A_i}{t_{adh}} \quad k_{St} = \frac{G A_i}{t_{adh}}$$

For the springs located in the areas of the adhesive layer in which the tensile/peel stresses increase, at the ends, effective moduli in direction z, E'<E, must be used due to the fact that the greater rigidity of the adherents with respect to the adhesive, in addition to the small thickness of the layer, prevents the contraction of the adhesive in its place when it is pulled in a normal direction and this is equivalent to a stiffening in this direction.

When the deformation of the adhesive layer is prevented in direction x and y (edges of the layer—FEMCI, NASA, Farhad Tahmasebi):

$$\frac{\sigma_z}{\varepsilon_z} = \frac{(1-\upsilon)}{(1+\upsilon)(1-2\upsilon)} E = \frac{(1-\upsilon)}{(1-\upsilon-2\upsilon^2)} E = E'$$

When the deformation of the adhesive layer is prevented in one direction only (corners of the layer—FEMCI, NASA, Farhad Tahmasebi):

$$\frac{\sigma_z}{\varepsilon_z} = \frac{E}{1-\upsilon^2} = E'$$

For each spring of the model, an SPOINT is created the degree of freedom of which, which is a deformation, is defined by means of an MPC.

It should be observed that the structure of the MPC would be the following for $\epsilon_{zz}$:

$$MPC \quad 40000 \quad ID_{SPOINT} \quad 0 \quad t_{adhesiv} \quad ID_1 \quad 3 \quad -1.$$

$$ID_2 \quad 3 \quad 1.$$

The equation of the MPC would be as follows:

$$U0_{SPOINT} \times t_{adhesiv} + U3_{G1} \times (-1) + U3_{G2} \times 1 = 0|$$

The following is obtained from this equation:

$$U0_{SPOINT} = \frac{U3_{G1} - U3_{G2}}{t_{adhesiv}} = \varepsilon_{ZZ}$$

In a preferred embodiment, it is considered that the model provides optimal results when the thickness of the adhesive layer is less than 1 mm.

In sub-step 31, the model is calculated with a linear or non-linear solution, depending on whether the large rotations and displacements are to be taken into account.

When the problem being solved does not have large displacements and the material behaves in an elastic manner (plasticity will be studied separately with the iterative process which will be described below), the NASTRAN linear solution 101 can be applied which solves the previous system of equations, inverts the rigidity matrix and obtains the displacements in the nodes. The deformations and stresses are later recovered.

When the previous conditions (small displacements) do not occur, but rather there are displacements that are large enough to significantly affect the rigidity matrix, therefore the direction for applying the loads varies as the structure is deformed, non-linear solutions such as NASTRAN solution 106 or solution 600 must then be used.

Non-linear solutions are used to reproduce the non-linear effects of the problem being studied. They apply the load in increments and for each increment, iterations are carried out until the convergence conditions are fulfilled. The rigidity matrix is renewed to take into account the variation in the geometry of the structure. The main parameters of the non-linear analysis are defined with the NLPARM card of the bulk data. The number of load increments to be considered, every how many iterations the rigidity matrix value is to be renewed, the maximum number of iterations for each increment, the maximum number of bisections of the load increment and the values considered for the convergence criteria are stated in such card.

In order for the rigidity matrix to be renewed due to the fact the geometry of the structure has changed because large displacements have occurred, the parameter PARAM, LGIDISP, 1 (or 2) must be entered in the NASTRAN input. As has already been mentioned above, non-linear solutions apply the load P in small intervals $\Delta P$, which they apply one by one. Every time a load increment $\Delta P$ is applied, the structure is unbalanced and displacements occur in the nodes, but due to the rigidities of the elements, internal node reactions tending to balance the load $F=P+\Delta P$ arise, and then the structure again reaches the balanced state.

In order to calculate this new balanced state, the iterative process described below is carried out, in which the rigidity matrix value will be renewed every time a preset number of iterations is completed, until reaching convergence, i.e. the internal reactions in the nodes balance the external load $P+\Delta P$. Iterative process:

For each $\Delta P$, $F-R(u)=K(u)\times du(1)$, where:
$F=P+\Delta P$ is the accumulated load.
$K(u)$ is the tangent rigidity matrix.
$R(u)$ represent the internal reactions in the nodes, which are calculated with the following integral: $R=S_{elem}\int \beta^T \sigma dv$ (2)
Then: $F-R(u^{i-1})=K(u^{i-1})\times du^i$
From where $du^i$ is solved and $u^i=u^{i-1}+du^i$ is obtained which is again introduced and the process is thus carried out iteratively until reaching convergence, i.e. when $|R(u^i)-F|<\epsilon$, $\epsilon$ is a value which can be varied and based on which it is considered that the solution has converged, i.e. balance has been reached.

The Newton-Raphson method is being referred to when the rigidity matrix value is renewed in each iteration.

The $\Delta P$ are thus applied until applying the complete load of the problem which is being studied.

The convergence of the solution is not always achieved and then the parameters of the iterative process must be changed.

Once the values of the unknowns, i.e. the displacements in the nodes, have been calculated, the displacements in the elements, the deformations and the stresses are recovered.

In sub-step 33, the plasticity of the adhesive layer is analyzed. To that end, an iterative process is used whereby each of the points of the adhesive is made to comply with the non-linear law under shearing of the material.

The following algorithm can be used to carry out the iteration:

a) For a first NASTRAN run, it is assumed that G for the rigidities of the springs is $G=G$. The program is run and $F_{xi}$, $F_{yi}$, $F_{zi}$, $\delta_{xi}$, $\delta_{yi}$ (forces in the springs and relative displacements in direction x and y, of the coincident nodes in position i).

b) The tensile/peel stresses, shear stresses and shear deformations for each position i are calculated:

$$\sigma_{zi}=\frac{F_{zi}}{A_i}; \gamma_i=\gamma_i^0=\frac{\sqrt{\delta_{xi}^2+\delta_{zi}^2}}{t_{adhesiv}}; \tau_i=\tau_i^0=\frac{\sqrt{F_{xi}^2 F_{zi}^2}}{A_i}$$

c) For each position i, it is observed whether $\tau_i^0>\tau_e$ and if this is indeed so, then there is plasticity in this position.

Figure 10:
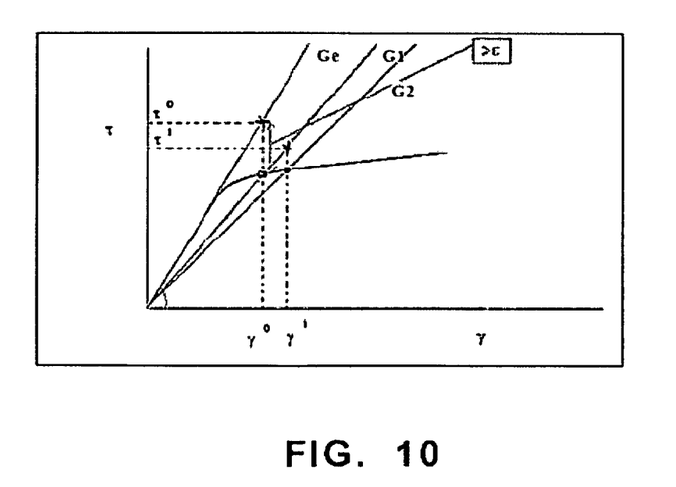
FIG. 10 shows the process for calculating the rigidity in the plasticity analysis by means of an iterative process.

If $\tau_i^0-\tau(\gamma_i^0)>\epsilon$, it is considered that there is no convergence and then the secant modulus is calculated (see FIG. 10):

$$G_1, G_1=\frac{\tau(\gamma_i^0)}{\gamma_i^0}.$$

d) The new shear rigidities of the springs are calculated with the new moduli and NASTRAN is run again with the new input and $\tau_i^1$ and $\gamma_i^1$ are obtained for each i, and then the same is carried out again. If $\tau_i^1-\tau(\gamma_i^1)<\epsilon$, there will be convergence; in contrast, the secant modulus $G_2$ is calculated and so on and so forth.

e) If before convergence occurs for all the i, $\sigma_{zi}>\sigma_{zmax}$ or $\gamma_i>\gamma_{max}$ in any of them, the iteration is then stopped given that the joint has failed.

Figure 11:
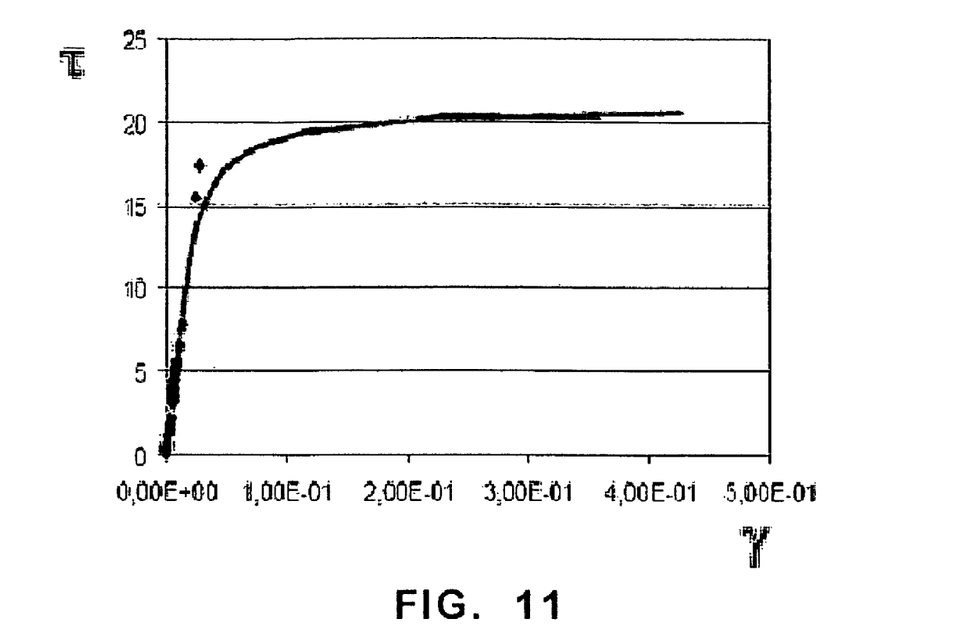
FIGS. 11, 12 and 13 show the results of the iterations necessary for reaching convergence in the plasticity analysis.
Figure 12:
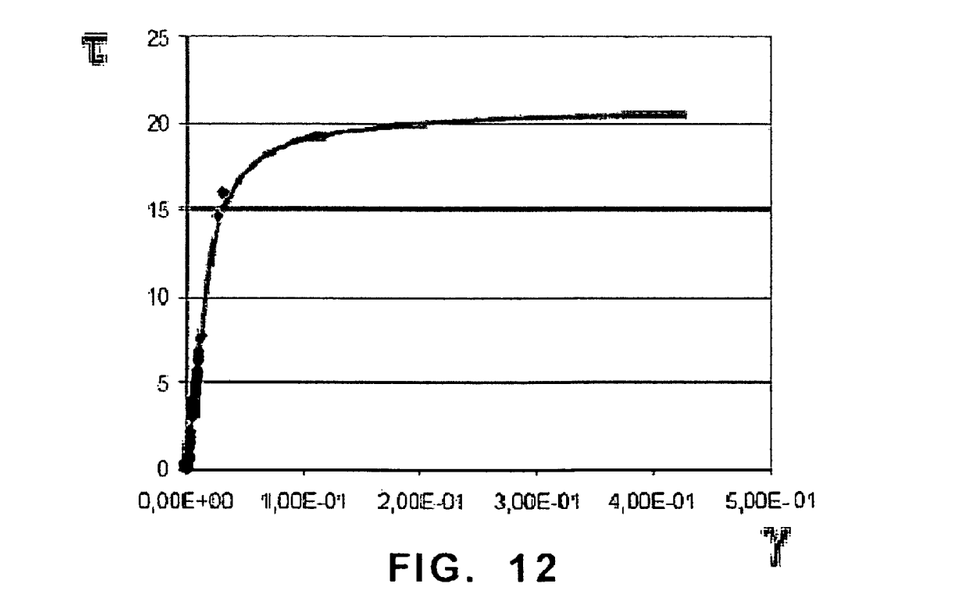
Figure 13:
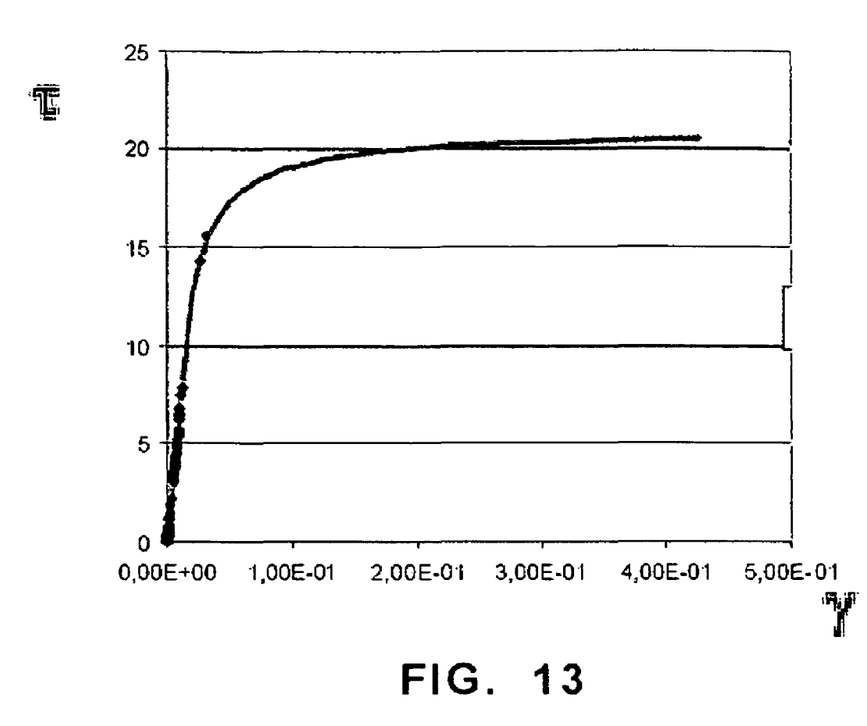

FIGS. 11, 12, 13 show the results of the three iterations necessary for converging in an example for applying the described process for a certain load increment value.

Calculation step 31 ends by running the models correcting the plasticity under shearing according to the iterative process described in the previous section until any of the $\sigma_Z$ (peel) values and $\gamma_{xy}$ (shear) values exceeds the admissible value.

Figure 14:
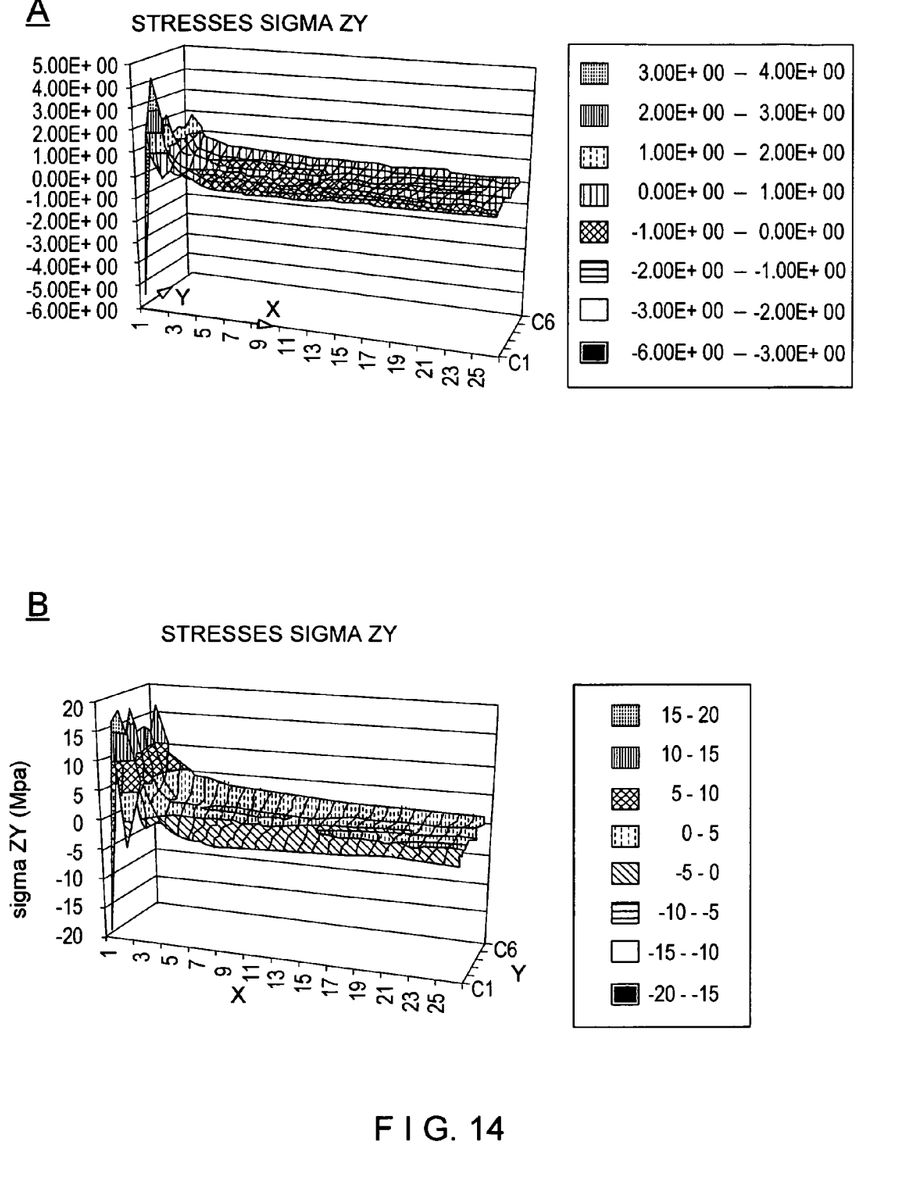
FIGS. 14 and 15 show the results obtained by means of the method object of the present invention.
Figure 15:
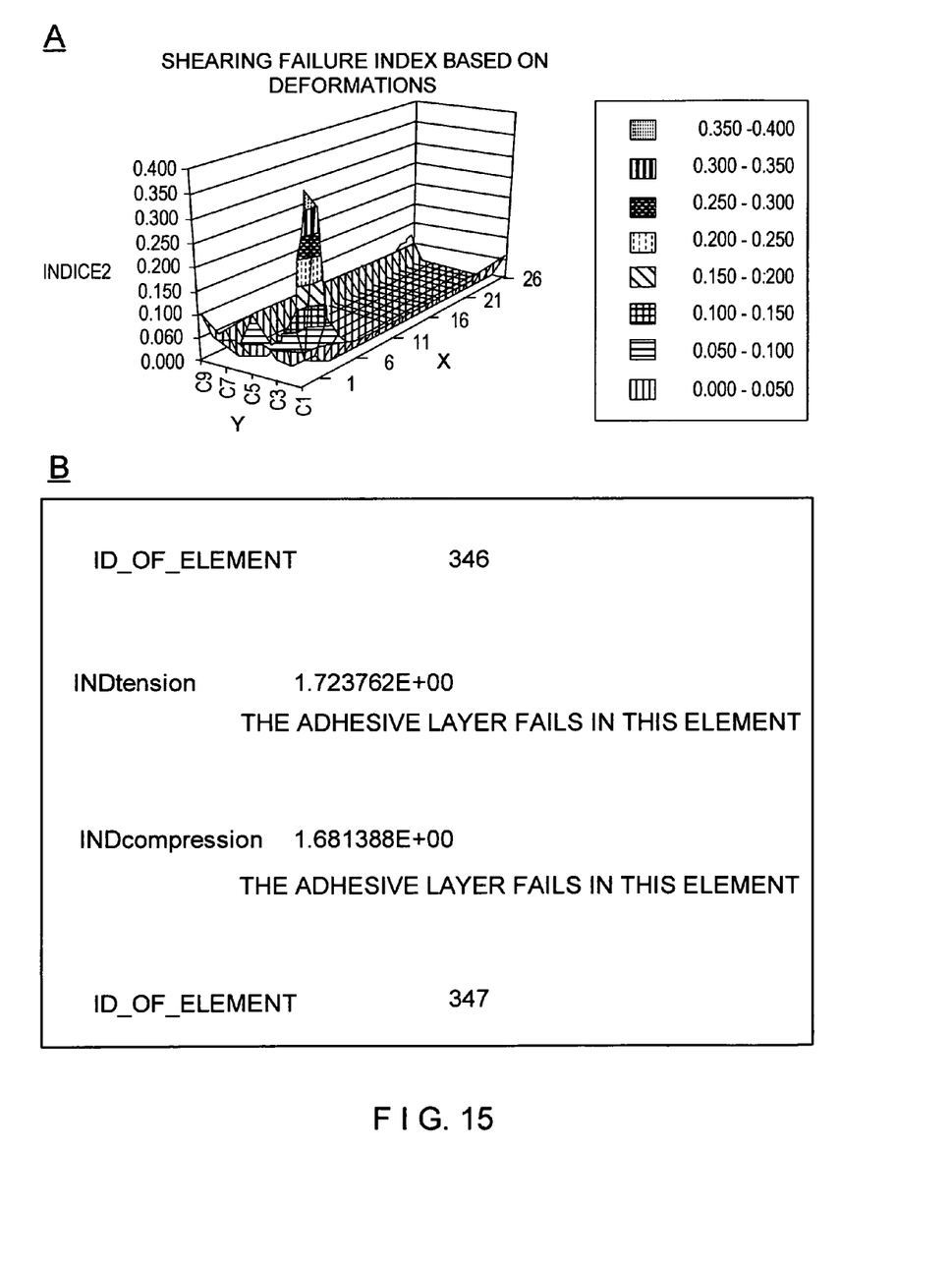

As can be seen in FIGS. 14 and 15, in the result display step 41, the three-dimensional representation of the peel and shear stresses in both directions as well as the failure indices for each failure mode, which allow predicting at which point and how the fracture of the adhesive occurs, are obtained.

FIG. 14 shows the distribution of strains-shear, peel stresses and shear deformations. It can be observed how the effect of plasticity tends to uniformize the strain level.

FIG. 15 shows the distribution of failure indices throughout the adhesive layer. As a result of the iterative plasticity study, failure indices based on deformations can be used and the weak point of the joint, i.e. where the failure will start, can be accurately obtained.

The modifications comprised within the scope defined by the following claims can be introduced in the preferred embodiment which has just been described.

The invention claimed is:
1. A computer-aided method aiding in a design of a structural joint of two composite material parts (11, 15) with an adhesive material layer (13), comprising the following steps:
   a) providing a Finite Element Model with information for analyzing said structural joint;
   b) providing a calculation model for calculating deformations of the adhesive material layer (13) when it is subjected to tensile/peel and shear stresses, including a plastic behavior of an adhesive of a linear type under tension/peeling and of a non-linear type under shearing; and
   c) simulating a behavior of said structural joint as bonded by applying the calculation model to obtain failure indices of each failure mode,
   wherein plastification criteria taking into account hydrostatic stress simulate in an approximate manner the effect that the tensile stresses have in the plastification process based on generation and coalescence of microcavities when large volumetric deformations occur in the adhesive material layer, and wherein said method includes calculating rigidity matrices of each element, and once the rigidity matrix of each element has been calculated in local axes, it is changed to global axes, after which the rigidity matrices of all the elements are assembled in order to obtain a global rigidity matrix of the structure.

2. The computer-aided method according to claim 1, wherein said two composite material parts (11, 15) are simulated using two-dimensional elements and said adhesive layer (13) is simulated sing spring elements (1, 2).

3. The computer-aided method according to claim 1, wherein said two composite material parts (11, 15) are a panel and a stiffening element of an aeronautical structure and a thickness of said adhesive material layer (13) is less than 1 mm.

4. A system having a processor and a memory coupled to said processor to aid in a design of a structural joint of two composite material parts (11, 15) with an adhesive material layer (13), using a computer-implemented Finite Element Model of said structural joint, comprising:

a computer-implemented modulus containing a parametric definition of certain features of said joint and which allows using said processor providing input data of said Finite Element Model;

wherein said Finite Element Model comprises a calculation model for calculating using said processor deformations of said adhesive material layer (13) when it is subjected to tensile/peel and shear stresses, including a plastic behavior of an adhesive of a linear type under tension/peeling and of a non-linear type under shearing and which allows simulating a behavior of said structural joint as bonded to obtain failure indices of each failure mode, wherein plastification criteria taking into account hydrostatic stress simulate in an approximate manner the effect that the tensile stresses have in the plastification process based on generation and coalescence of microcavities when large volumetric deformations occur in the adhesive material layer, and wherein said system calculates rigidity matrices of each element, and once the rigidity matrix of each element has been calculated in local axes, it is changed to global axes, after which the rigidity matrices of all the elements are assembled in order to obtain a global rigidity matrix of the structure.

5. The system according to claim 4, wherein said two composite material parts (11, 15) are a panel and a stiffening element of an aeronautical structure and the thickness of said adhesive material layer (13) is less than 1 mm.

6. The computer-aided method according to claim 2, wherein said two composite material parts (11, 15) are a panel and a stiffening element of an aeronautical structure and a thickness of said adhesive material layer (13) is less than 1 mm.

* * * * *

UNITED STATES PATENT AND TRADEMARK OFFICE
CERTIFICATE OF CORRECTION

PATENT NO. : 8,229,717 B2  
APPLICATION NO. : 12/080087  
DATED : July 24, 2012  
INVENTOR(S) : Ignacio Riveira Rodriguez et al.

Page 1 of 1

It is certified that error appears in the above-identified patent and that said Letters Patent is hereby corrected as shown below:

Title Page, item (73), Assignee: "Airbus Espana, S.L." should read
--Airbus Operations, S.L.--.

Signed and Sealed this
Fifth Day of March, 2013

Teresa Stanek Rea
*Acting Director of the United States Patent and Trademark Office*